United States Patent [19]

Maier

[11] 4,214,479
[45] Jul. 29, 1980

[54] CAPACITIVE TYPE FUEL PROBE COMPENSATION CIRCUIT

[75] Inventor: Lawrence C. Maier, Middlebury, Vt.

[73] Assignee: Simmonds Precision Products, Inc., Tarrytown, N.Y.

[21] Appl. No.: 42,252

[22] Filed: May 21, 1979

[51] Int. Cl.² ............................................. G01F 23/26
[52] U.S. Cl. .................................. 73/304 C; 361/284
[58] Field of Search ....................... 73/304 C; 361/284

[56] References Cited

U.S. PATENT DOCUMENTS

| 3,237,178 | 2/1966 | Valentine | 73/304 C |
| 4,090,408 | 5/1978 | Hedrick | 73/304 C |

Primary Examiner—Donald O. Woodiel
Attorney, Agent, or Firm—Edwin E. Greigg

[57] ABSTRACT

A full height compensation circuit for a capacitive type probe of the type used to measure the mass of fuel in a tank which includes a probe capacitor for immersion in the fuel connected to a source of power for supplying current to the probe capacitor, the probe capacitor current being summed with a current corresponding to the capacitance of the fuel tank in the empty state to provide an output voltage, the output voltage being positively integrated to a predetermined value as determined by the number of pulses counted by a counter, following which the counter is actuated to count down the number of pulses required to return the integrated output voltage to zero, and the number of pulses counted down providing a digital number output proportional to the mass of fuel sensed by the probe capacitor.

9 Claims, 2 Drawing Figures

CAPACITIVE TYPE FUEL PROBE COMPENSATION CIRCUIT

This invention relates to capacitance fuel gauge systems, and more particularly to a full height compensation circuit for such a system.

BACKGROUND OF THE INVENTION

In present day apparatus, for the measurement of the mass of fuel within a fuel tank such as a fuel tank used on aircraft, a capacitive type unit is commonly employed. Such a capacitive type measuring unit is generally in the form of a probe inserted into the fuel tank so that its capacitance varies as a function of the liquid level as well as the dialectric constant of the fuel. Generally, a series capacitor of a fixed value is also utilized in such a capacitive probe unit for compensation so that the output of the probe varies directly as the mass of the sensed fuel. Heretofore, such a compensating capacitor has been mounted on the probe, adding to the complexity of the unit. In addition, this series capacitor has a critical value and must be selected for one specific fuel, so that the aircraft must use the specific fuel for which the series capacitor is designed or change probe units for each type of fuel used. Furthermore, since the series capacitor is mounted on the probe, it is exposed to the rather harsh tank environment so that its useful life is shortened and a premature failure of the probe is not uncommon.

OBJECTS AND SUMMARY OF THE INVENTION

Accordingly, it is therefore a primary object of this invention to provide a new and novel capacitive type probe for measuring the mass of fuel in a fuel tank which eliminates the mounting of a compensating component on the probe.

Another object of this invention is to provide a new and novel full height compensation circuit for a capacitive type probe which does not affect the linearity of the probe, so that profiling is not required.

A further object of this invention is to provide a new and novel digital capacitive gauging system for measuring fuel mass in a fuel tank, which permits the use of full height compensation with linear, unprofiled probes such as are used in a computerized fuel gauge.

Still another object of this invention is to provide a new and novel full height compensation circuit for a capacitive type fuel probe which is simple and inexpensive in construction, in which the compensation circuitry is not exposed to the harsh tank environment with attendant improved reliability and which produces an output digital signal corresponding to the mass of the sensed fuel which signal is suitable for direct interface with a computer.

A still further object of this invention is to provide a new and novel full height compensation circuit for a capacitive type fuel probe which permits the use of different fuels with only a simple adjustment, which permits the use of a single system for several types of fuel on a switch selective basis and which permits the use of a single compensation component for two or more tanks, utilizing the same fuel.

The objects of this invention and other related objects are accomplished by the provision of a probe capacitor for a fuel tank, the capacitance of which varies with the level of fuel in the tank and means are provided for supplying a current to the probe capacitor together with means for producing a current corresponding to the capacitance of the fuel tank in the empty state, the current corresponding to the capacitance of the fuel tank in the empty state being summed with the current from the capacitive probe in the tank to provide an output voltage which output voltage is integrated and converted to pulses counted up by a pulse counter for a predetermined number of counts, after which the integration is terminated, and the output voltage integrated downwardly by counting the number of pulses required to return the integrated output voltage to zero to provide a digital number at the zero value of the output voltage which is stored and read out as a direct digital output which is proportional to the fuel mass sensed by the fuel probe.

This invention will be better understood as well as further objects and advantages thereof become more apparent from the ensuing detailed description of preferred embodiments in conjunction with the drawings.

DESCRIPTION OF THE PREFERRED EMBODIMENT

Figure 1:
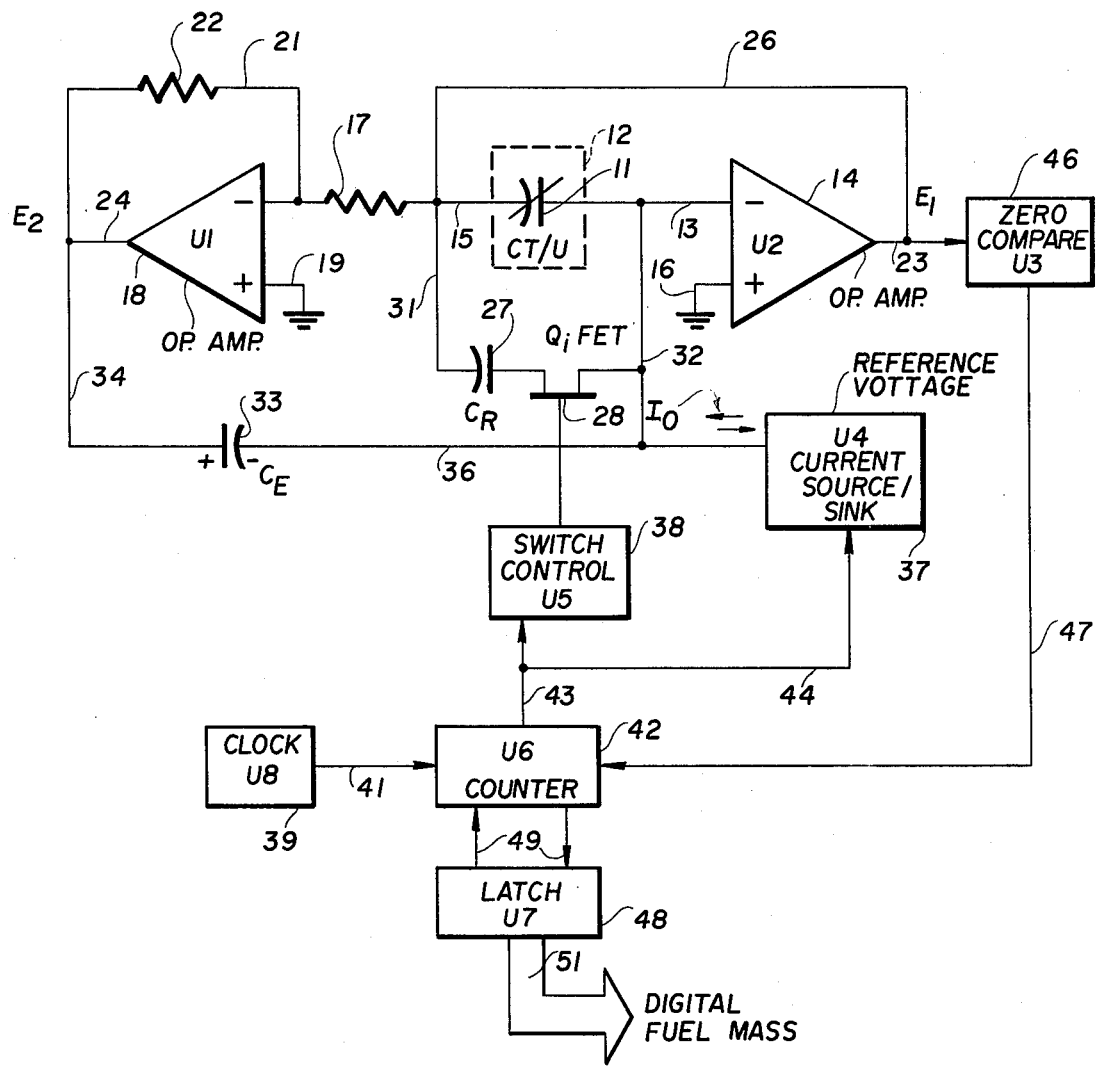
FIG. 1 is a block diagram of an AC full height compensation circuit for a capacitive type fuel probe constructed in accordance with the invention.

Referring now to FIG. 1, the circuit of the invention is utilized in conjunction with a probe capacitor 11 arranged to be suitably mounted within a fuel tank designated generally by broken lines and the reference numeral 12 so that its capacitance varies in accordance with the level of fuel in the tank. The probe capacitor 11 is also identified as CT/U and is connected at one side by conductor 13 to one input of an operational amplifier 14 (U2). The other input of amplifier 14 is grounded at 16. The other side of the probe capacitor 11 is connected by means of conductor 15 through a resistor 17 to one input of a second operational amplifier 18, the other input of which is grounded at 19. The operational amplifier 18 (U1) includes a feedback circuit 21 including a resistor 22. Operational amplifiers 14, 18 are provided with outputs 23, 24 at which output voltages $E_1$, $E_2$ respectively, appear.

The junction between capacitor 11 and resistor 17 is connected by means of a conductor 26 to the output 23 of operational amplifier 14.

The circuit of FIG. 1 also includes a scaling capacitor 27 and a field-effect transistor (FET) 28 connected in series and both the capacitor 27 ($C_R$) and the FET 28 ($Q_1$) are connected in parallel with the probe capacitor 11 by means of conductors 31, 32.

The capacitance of the fuel tank with which the circuit of FIG. 1 is associated is represented schematically by a capacitance 33, the side adjacent the output 24 of operational amplifier 18 represented by the line 34. The other side of capacitor 33 is schematically connected by means of line 36 to conductor 32 and to a current source/sink 37 (U4) which provides a reference voltage and for which bi-directional current flow is represented by the double arrow $I_0$.

The source and drain of FET 28 is connected to one side of capacitor 27 and to conductor 32 respectively and the base of FET 28 is connected to a control switch 38 (U5). The circuit of FIG. 1 also includes a clock 39

(U8) which provides clock pulses on conductor 41 to a counter 42 (U6), the output of which is connected by conductor 43 to the input of control switch 38. The counter output on conductor 43 is also connected by conductor 44 to the input of the current source/sink 37.

The circuit of FIG. 1 also includes a comparator (zero compare U3), the input of which is connected to the output 23 of operational amplifier 14. The output of comparator 46 is connected by conductor 47 to one input of the counter 42. The counter 42 interfaces with a register or latch 48 (U7) through conductors 49 and the output 51 of latch 48 is arranged to provide a digital output as indicated by the unshaded arrow of FIG. 1.

In the operation of the circuit of FIG. 1, assuming that the output voltage $E_1$ is at zero and that FET 28 is turned on, the current $I_0$ from the current source/sink 37 is in a direction so as to cause $E_1$ to integrate in a positive direction. The operational amp 18 (U1) inverts $E_1$ (applied to the inverting input of amplifier 18 through conductor 26 and resistor 17) to produce the output voltage $E_2$ at output 24. The output voltage $E_2$ drives capacitor 33 and the current from capacitor 33 is summed with the current from probe capacitor 11 (CT/U). If the empty tank value of probe capacitor 11 is the capacitance represented by capacitor 33 and if $E_2 = -E_1$, then the total value of the immersed probe capacitor when the tank is full is $(KC_e - C_e) = (K-1)C_e$ where K is the dielectric constant of the fuel. This becomes the effective value of the integration capacitor $(C_e + C_r)$ for operational amplifier 14 (U2). The clock 39 (U8) operates at a frequency f with a period 1/f. Counter 42 (U6) allows the positive integration of operational amp 14 (U2) for N counts. At the end of this time, $$E_1 = \frac{I_o N}{f([K-1]Ce + Cr)}.$$

The current source/sink 34 (U4) then reverses direction and FET 28 (Q1) is turned on. During the down ingetration, the counter 42 (U6) counts the number of clock pulses ($N_1$) required to return $E_1$ to zero. At this time, comparator 46 (U3) terminates the count and loads $N_1$ into the register or latch 48 (U7). The output of the latch 48 is then a digital number ($N_1$) which is proportional to the fuel mass sensed by the fuel probe capacitor 11 (C t/u).

Since the voltage change required to return $E_1$ to zero is the same as the voltage at the end of the positive integration, it can be written:

$$\frac{I_o N}{f([K-1]Ce + Cr)} = E_1 = \frac{I_o N_1}{f([K-1]Ce)} \quad \text{Equation 1}$$

up integration    down integration

From Equation 1

$$\frac{(K-1)Ce}{(k-1)Ce + Cr} = \frac{N_1}{N} \quad \text{Equation 2}$$

where N is fixed. Therefore $N_1$ is proportional to the left hand quantity of Equation 2.

The general form of the fuel equation can be written:

$$\frac{(K-1)}{D} = A[1 + B(K-1)] \quad \text{Equation 3}$$

where A and B are specific for a particular fuel. Solving Equation 3 at end point densities D min and D max yields two K values:
$K_1$ a D min
$K_2$ a D max
Substituting in Equation 2:

$$\frac{(K_1 - 1)Ce}{(K_1 - 1)Ce + Cr} = \frac{N_{11}}{N} \quad \text{Equation 4}$$

$$\frac{(K_2 - 1)Ce}{(K_2 - 1)Ce + Cr} = \frac{N_{12}}{N} \quad \text{Equation 5}$$

For the mass output, $N_1$, to be mass compensated, the ratio of the circuit outputs at D min and D max must equal the ratio of endpoint densities:

$$\frac{N_{12}}{N_{11}} = \frac{D \max}{D \min} \quad \text{Equation 6}$$

From Equations 4, 5 and 6:

$$\frac{(K_2 - 1)Ce}{(K_2 - 1)Ce + Cr} \cdot \frac{(K_1 - 1)Ce + Cr}{(K_1 - 1)Ce} = \quad \text{Equation 7}$$

$$\frac{(K_2 - 1)}{(K_1 - 1)} \cdot \frac{(K_1 - 1)Ce + Cr}{(K_2 - 1)Ce + Cr} = \frac{D \max}{D \min}$$

Solving Equation 7 for Cr yields $$Cr = \beta Ce \quad \text{Equation 8}$$

where $\beta$ is a constant determined by the particular fuel used.

With Equation 8 satisfied, the digital number ($N_1$) out of the latch 48 (U7) is proportional to the mass of fuel sensed by the probe capacitor 11 (C t/u). This meets the requirements of a full height compensated system. Thus, in the circuit of FIG. 1, it can be seen that only an AC capacitive type probe is required to meet the FHC requirements using the conversion technique outlined above. By using several capacitors 27 (Cr) scaled for different fuels and a separate FET 28 (Q1) for each, the switch control 38 (U5) can be designed such that the system would work with different fuels on a switch selectable basis.

Figure 2:
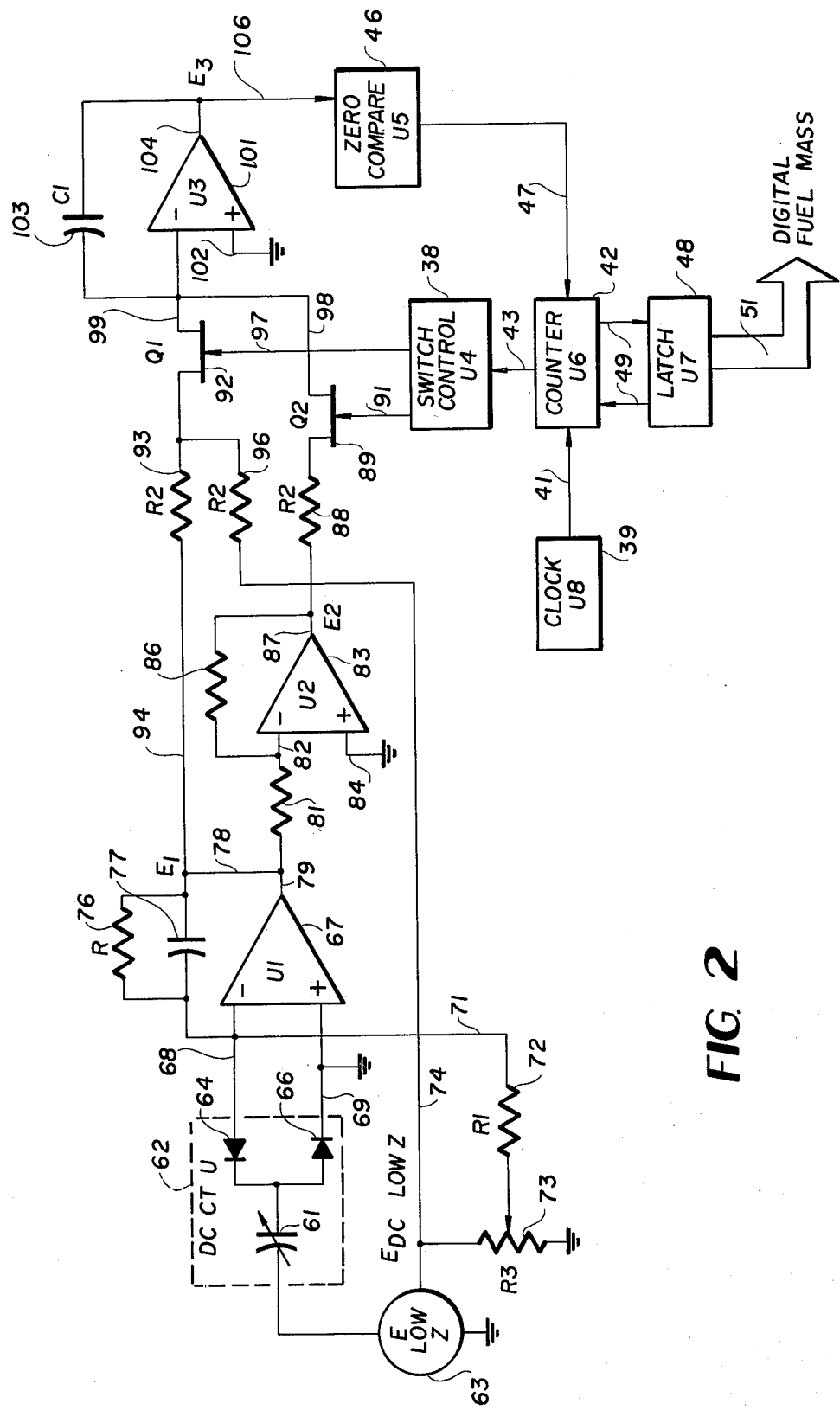
FIG. 2 is a block diagram of another embodiment of the invention, utilizing DC.

Referring now to FIG. 2 there is shown another embodiment of the invention which utilizes DC power and wherein like numerals have been utilized to identify like parts. In the circuit of FIG. 2, the probe capacitor 61 (DC CT/U) installed in a fuel tank represented by the broken lines and identified by the reference numerals 62 is connected at one side to a low z oscillator 63 (E LOW Z). The other side of probe capacitor 61 is connected by means of oppositely poled diodes 64, 66 to the inputs of an operational amplifier 67 (U1) by means of conductors 68, 69 respectively, conductor 69 being grounded as shown. The conductors 68 connected to the inverting output of operational amplifier 67 is connected by conductor 71 through a resistor 72 (R1) to the adjustable contact of a potentiometer 73 (R3). One side of the potentiometer 73 is grounded and the other side is connected to a conductor 74 connected to an output of the high frequency oscillator 63.

Amplifier 67 includes a feedback circuit comprising a resistor 67 and capacitor 77 connected in parallel and connected by means of conductor 78 to the output 79 of amplifier 67 to provide an output voltage $E_1$.

The output 79 of amplifier 67 is connected through a resistor 81 to the inverting input 82 of a second operational amplifier 83 the other input of which is grounded at 84. Amplifier 83 (U2) includes a feedback circuit having a resistor 86 and has an output 87 for providing an output voltage $E_2$.

The output 87 of amplifier 83 is connected through resistor 88 to the source of a field-effect transistor 89 (Q2) the base of which is connected by conductor 91 to a switch control 38 (U4).

The circuit of FIG. 2 also includes a second field-effect transistor 92 (Q1) having its source connected through resistor 93 to conductor 94 on which output voltage $E_1$ appears. The output of the high frequency oscillator 63 connected to conductor 74 is also connected through resistor 96 to the source of FET 92 (Q1) and the base of FET 92 is connected by conductor 97 to a second output from switch control 38 (Q4).

The drains of the FET's 89, 92 are connected by conductors 98, 99 respectively, to the inverting input of a third operational amplifier 101 (U3) the other input of which is grounded at 102. The operational amplifier 101 is also provided with a feedback circuit including capacitor 103 (C1) and includes an output 104 for producing an output voltage $E_3$. The output 104 of amplifier 101 (U3) is fed to comparator 46 (U5) by means of conductor 106 and the output of comparator 46 is fed by conductor 47 to counter 42. The circuit of FIG. 2 also includes a clock 39 (U8) connected to the counter 42 by means of conductor 41 conductor 43 for connecting the output of counter 42 (U6) to switch control 38 (U4) and conductors 49 for interconnecting counter 42 with latch 48 (U7) the output of which represented by the unshaded arrow 51 as in the embodiment of FIG. 1.

In the operation of the circuit of FIG. 2, the standard DC tank unit (DC CT/U) containing probe capacitor 61 is excited by the high frequency oscillator 63. A DC sample of the oscillator output is scaled and returned to the summing node of amplifier 67 (U1) out of phase with the tank unit (CT/U) current. Since when the tank is full, CT/U=(K−1)Ce+Ce, the output voltage $E_1$ can be written:

$$\frac{(E_{LZ})\Omega}{\pi}[(K-1)Ce + Ce]R - (E\,DC\,\text{low}\,z)\beta\frac{R}{R_1} = E_1 \quad \text{Equation 9}$$

Selecting $\beta$ such that $(E\,DC\,\text{low}\,z)\beta\,R/R_1 = \frac{(E\,\text{low}\,z)\Omega R\,Ce}{\pi}$ Equation 10

($\beta$ = ratio of $R_3$)

Substituting Equation 10 in Equation 9.

$$\frac{(E\,\text{low}\,z)\Omega(K-1)\,Ce\,R}{\pi} + \frac{(K\,\text{low}\,z)\Omega Ce\,R}{\pi} -$$

$$\frac{(E\,\text{low}\,z)\,\Omega Ce\,R}{\pi} = E_1$$

$$E_1 = \frac{(E\,\text{low}\,z)\Omega R\,(K-1)\,Ce}{\pi}$$

Let $\frac{(E\,\text{low}\,z)\,\Omega R}{\pi} = \alpha$ \quad Equation 11

Then
$$E_1 = \alpha(K-1)Ce \quad \text{Equation 12}$$

$E_2$ is $E_1$ inverted, therefor $$E_2 = -\alpha(K-1)Ce \quad \text{Equation 13}$$

With $E_3$ at zero, $Q_2$ is turned on and $E_3$ starts integrating up for N counts of Counter (U6). At the end of this time:

$$E_3 = \frac{\alpha(K-1)Ce\,N}{fR_2\,C_1} \quad \text{Equation 14}$$

At the end of N counts, counter 42 (U6) activates the switch control 38 (U4) which turns FET 89 (Q2) off and FET 92 (Q1) on. Output $E_3$ starts to integrate back down to zero. It takes $N_1$ counts of the counter 42 (U6) for output voltage $E_3$ to reach zero. Since the change in voltage during the up integration equals the change in voltage of the down integration:

$$E_3 = \frac{[\alpha(K-1)Ce + E\,DC\,\text{low}\,z]\,N_1}{fR_2\,C_1} \quad \text{Equation 15}$$

Combining Equations 14+15:

$$\frac{\alpha(K-1)Ce\,N}{} = \frac{[\alpha(K-1)Ce + E\,DC\,\text{low}\,z]\,N_1}{fR_2\,C_1} \quad \text{Equation 16}$$

$$\frac{\alpha(K-1)Ce}{\alpha(K-1)Ce + E\,DC\,\text{low}\,z} = \frac{N_1}{N}$$

Equation 16 is of the same form as Equation 2. By applying the same logic and using Equations 16 and 3:

$$\frac{(K_2-1)}{(K_1-1)} \cdot \frac{\alpha(K_1-1)Ce + E\,DC\,\text{low}\,z}{\alpha(K_2-1)Ce + E\,DC\,\text{low}\,z} = \frac{N_{12}}{N_{11}} \quad \text{Equation 17}$$

If E DC low z=E low z then Equation 17 can be combined with Equation 11 to yield:

$$\frac{\pi}{\Omega R} = \gamma Ce \quad \text{Equation 18}$$

where $\gamma$ is a constant determined by the specific fuel From Equation 18:

$$R = \frac{\pi}{W\gamma Ce} \quad \text{Equation 19}$$

At the end of the down integration, comparator 46 (U5) causes the counter 42 (U6) to load the accumulated pulses, $N_1$, into the latch 48 (U7). If Equation 19 is satisfied, $N_1$ will be proportional to the mass sensed by the probe 61 (CT/U). Thus, through these calculations we have provided a FHC fuel probe.

No compensation components are required on such an FHC fuel probe and a standard DC probe may be used. As in the embodiment of FIG. 1, switch selectable compensation can be implemented for various fuels.

What is claimed and desired to be secured by Letters Patent of the United States is:

1. A full height compensation circuit for a capacitive type probe for a fuel tank comprising, in combination, a probe capacitor for a fuel tank having a capacitance which varies with the level of fuel in said tank, means for supplying a current to said probe capacitor, means for controlling said current supply means, means for producing a current corresponding to the capacitance of said fuel tank in an empty state, means for summing the current corresponding to the capacitance of said fuel tank and the current from said probe capacitor, means for producing an output voltage corresponding to the current from said summing means, means for integrating said output voltage and means for converting said integrated output voltage to a digital number proportional to the mass of fuel sensed by said probe capacitor.

2. A compensation circuit in accordance with claim 1 including a scaling capacitor having a value corresponding to the type of fuel in said tank connected to said probe capacitor.

3. A compensation circuit in accordance with claim 2 wherein said converting means include clock means for generating a series of clock pulses, and up/down counter for counting up the pulses from said clock means for a predetermined period of time during the integration of said output voltage and for counting down the number of counted clock pulses to return said integrated output voltage to zero and digital readout means for storing said number of clock pulses counted down to provide a digital output proportional to the mass of fuel in said fuel tank.

4. A compensation circuit in accordance with claim 3 wherein said means for integrating said output voltage include a zero comparator having an output connected to said counter and including means for applying said output voltage to said zero comparator.

5. A compensation circuit in accordance with claim 4 wherein said means for controlling said current supplying means comprises a reversable current source and an FET transistor connected to the output of said current source.

6. A compensation circuit in accordance with claim 5 wherein said means for converting said integrated output voltage to a digital number include a latch having an input connected to said counter and wherein said counted down pulses from said counter into said latch.

7. A compensation circuit in accordance with claim 1 wherein said means for supplying a current to said probe capacitor comprises oscillator means.

8. A compensation circuit in accordance with claim 7 including means for providing a DC sample of said oscillator means and means for combining said DC sample of said oscillator means with the current corresponding to the capacitance of said probe capacitor.

9. A compensation circuit in accordance with claim 8 wherein said means for producing an output voltage corresponding to the current from said summing means include amplifier means wherein said means for controlling said current supplying means includes at least one FET transistor connected to said amplifier means.

* * * * *